US009912566B1

(12) United States Patent
Penno et al.

(10) Patent No.: US 9,912,566 B1
(45) Date of Patent: Mar. 6, 2018

(54) METHOD AND APPARATUS FOR TRACING PATHS IN SERVICE FUNCTION CHAINS

(71) Applicant: CISCO TECHNOLOGY, INC., San Jose, CA (US)

(72) Inventors: Reinaldo Penno, San Ramon, CA (US); Paul Quinn, Wellesley, MA (US); Carlos M. Pignataro, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 273 days.

(21) Appl. No.: 14/803,649

(22) Filed: Jul. 20, 2015

(51) Int. Cl.
 *H04L 12/26* (2006.01)
 *H04L 29/12* (2006.01)

(52) U.S. Cl.
 CPC ........ *H04L 43/10* (2013.01); *H04L 29/12216* (2013.01); *H04L 43/04* (2013.01)

(58) Field of Classification Search
 None
 See application file for complete search history.

(56) References Cited

U.S. PATENT DOCUMENTS

| | | | |
|---|---|---|---|
| 7,895,425 B2 | 2/2011 | Khalid et al. | |
| 8,670,326 B1 * | 3/2014 | Balasubramanian | H04L 45/22 370/238 |
| 2004/0215758 A1 * | 10/2004 | Kompella | H04L 43/50 709/223 |
| 2009/0086645 A1 | 4/2009 | Hedayat et al. | |
| 2014/0313928 A1 | 10/2014 | Fernando et al. | |
| 2015/0036478 A1 | 2/2015 | Shah et al. | |
| 2015/0131484 A1 * | 5/2015 | Aldrin | H04L 41/12 370/254 |
| 2017/0078175 A1 * | 3/2017 | Xu | H04L 12/24 |

OTHER PUBLICATIONS

IETF RFC 4291 "IP Version 6 Addressing Architecture", R. Hinden et al., Feb. 2006.
IETF draft-ietf-sfc-architecture-07, "Service Function Chaining (SFC) Architecture", J. Halpern et al., Mar. 6, 2015.
IETF draft-quinn-sfc-nsh, "Network Service Header", P. Quinn et al., Feb. 24, 2015.

* cited by examiner

*Primary Examiner* — Alex Skripnikov
(74) *Attorney, Agent, or Firm* — Cindy Kaplan

(57) ABSTRACT

In one embodiment, a method includes receiving a trace request packet at a service node in a service chain, the trace request packet comprising a service path identifier, a service index, and a service index limit, processing the trace request packet at the service node, generating a trace report packet at the service node, the trace report packet comprising service function information for the service node, and transmitting the trace report packet. An apparatus and logic are also disclosed herein.

19 Claims, 6 Drawing Sheets

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+\
|Ver|1|C|R|R|R|R|R|R|   Length    | MD-type=0x1 |  OAM Protocol | |
+-+-+-+-+-+-+-+-+-+-+-+-+-+-+-+-+-+-+-+-+-+-+-+-+-+-+-+-+-+-+-+-+ |
|            Service Path ID                    | Service Index | |
+-+-+-+-+-+-+-+-+-+-+-+-+-+-+-+-+-+-+-+-+-+-+-+-+-+-+-+-+-+-+-+-+ |
|                    Mandatory Context Header                   | |S
+-+-+-+-+-+-+-+-+-+-+-+-+-+-+-+-+-+-+-+-+-+-+-+-+-+-+-+-+-+-+-+-+ |F
|                    Mandatory Context Header                   | |C
+-+-+-+-+-+-+-+-+-+-+-+-+-+-+-+-+-+-+-+-+-+-+-+-+-+-+-+-+-+-+-+-+ |
|                    Mandatory Context Header                   | |
+-+-+-+-+-+-+-+-+-+-+-+-+-+-+-+-+-+-+-+-+-+-+-+-+-+-+-+-+-+-+-+-+ |
|                    Mandatory Context Header                   | |
+-+-+-+-+-+-+-+-+-+-+-+-+-+-+-+-+-+-+-+-+-+-+-+-+-+-+-+-+-+-+-+-+ <
|Trace Msg Type |     SIL     |           Dest Port             | |S
+-+-+-+-+-+-+-+-+-+-+-+-+-+-+-+-+-+-+-+-+-+-+-+-+-+-+-+-+-+-+-+-+ |F
|                        Dest IP Address                        | |C
+-+-+-+-+-+-+-+-+-+-+-+-+-+-+-+-+-+-+-+-+-+-+-+-+-+-+-+-+-+-+-+-+ |
|                        Dest IP Address                        | |P
+-+-+-+-+-+-+-+-+-+-+-+-+-+-+-+-+-+-+-+-+-+-+-+-+-+-+-+-+-+-+-+-+ |A
|                                                               | |T
|                        Dest IP Address                        | |H
+-+-+-+-+-+-+-+-+-+-+-+-+-+-+-+-+-+-+-+-+-+-+-+-+-+-+-+-+-+-+-+-+ |
|                        Dest IP Address                        | |T
+-+-+-+-+-+-+-+-+-+-+-+-+-+-+-+-+-+-+-+-+-+-+-+-+-+-+-+-+-+-+-+-+/ R
                                                                   A
                                                                   C
                                                                   E
```

FIGURE 5

```
                                    ╱ 60
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+\
|Ver|1|C|R|R|R|R|R|    Length     |  MD-type=0x1  |  OAM Protocol | |
+-+-+-+-+-+-+-+-+-+-+-+-+-+-+-+-+-+-+-+-+-+-+-+-+-+-+-+-+-+-+-+-+ |
|              Service Path ID                    | Service Index | |
+-+-+-+-+-+-+-+-+-+-+-+-+-+-+-+-+-+-+-+-+-+-+-+-+-+-+-+-+-+-+-+-+ |
|                    Mandatory Context Header                   | |S
+-+-+-+-+-+-+-+-+-+-+-+-+-+-+-+-+-+-+-+-+-+-+-+-+-+-+-+-+-+-+-+-+ |F
|                    Mandatory Context Header                   | |C
+-+-+-+-+-+-+-+-+-+-+-+-+-+-+-+-+-+-+-+-+-+-+-+-+-+-+-+-+-+-+-+-+ |
|                    Mandatory Context Header                   | |
+-+-+-+-+-+-+-+-+-+-+-+-+-+-+-+-+-+-+-+-+-+-+-+-+-+-+-+-+-+-+-+-+ |
|                    Mandatory Context Header                   | |
+-+-+-+-+-+-+-+-+-+-+-+-+-+-+-+-+-+-+-+-+-+-+-+-+-+-+-+-+-+-+-+-+ <
|Trace Msg Type |      SIL        |           Dest Port          | |S
+-+-+-+-+-+-+-+-+-+-+-+-+-+-+-+-+-+-+-+-+-+-+-+-+-+-+-+-+-+-+-+-+ |F
|                         Dest IP Address                       | |C
+-+-+-+-+-+-+-+-+-+-+-+-+-+-+-+-+-+-+-+-+-+-+-+-+-+-+-+-+-+-+-+-+ |
|                         Dest IP Address                       | |P
+-+-+-+-+-+-+-+-+-+-+-+-+-+-+-+-+-+-+-+-+-+-+-+-+-+-+-+-+-+-+-+-+ |A
|                         Dest IP Address                       | |T
+-+-+-+-+-+-+-+-+-+-+-+-+-+-+-+-+-+-+-+-+-+-+-+-+-+-+-+-+-+-+-+-+ |H
|                         Dest IP Address                       | |T
+-+-+-+-+-+-+-+-+-+-+-+-+-+-+-+-+-+-+-+-+-+-+-+-+-+-+-+-+-+-+-+-+ |R
| SF Type Len   |          SF Type ...                          | |A
+-+-+-+-+-+-+-+-+-+-+-+-+-+-+-+-+-+-+-+-+-+-+-+-+-+-+-+-+-+-+-+-+ |C
| SF Name Len   |          SF Name ...                          | |E
+-+-+-+-+-+-+-+-+-+-+-+-+-+-+-+-+-+-+-+-+-+-+-+-+-+-+-+-+-+-+-+-+ /
```

FIGURE 6

METHOD AND APPARATUS FOR TRACING PATHS IN SERVICE FUNCTION CHAINS

TECHNICAL FIELD

The present disclosure relates generally to communications networks, and more particularly, to service function chaining.

BACKGROUND

Network services are widely deployed and important in many networks. Services provide a range of features such as security, wide area network acceleration, firewall, server load balancing, deep packet inspection (DPI), intrusion detection service (IDS), and Network Address Translation (NAT). Network services may be employed at different points in a network infrastructure, including for example, wide area network, data center, campus, and the like. The services may be applied as part of a service chain.

Route (path, connection) tracing may be used in a network to identify problem areas and provide detailed information about the network. A trace may be used, for example, to determine why connections to a given node might be poor, and can often identify the location of problems in cases of instability or other malfunction. Conventional route tracing packets, however, do not follow the path of a service chain and therefore cannot be used to detect the liveness of a service path or information about services.

BRIEF DESCRIPTION OF THE DRAWINGS

FIG. 5 illustrates a trace request packet format, in accordance with one embodiment.

FIG. 6 illustrates a trace report packet format, in accordance with one embodiment.

Corresponding reference characters indicate corresponding parts throughout the several views of the drawings.

DESCRIPTION OF EXAMPLE EMBODIMENTS

Overview

Figure 1:
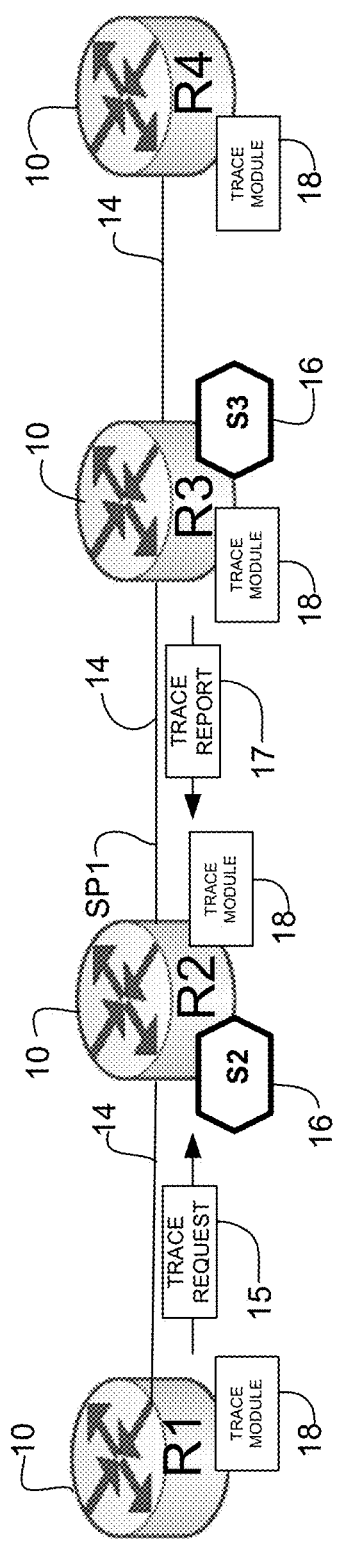
FIG. 1 illustrates an example of a network in which embodiments described herein may be implemented.

In one embodiment, a method generally comprises receiving a trace request packet at a service node in a service chain, the trace request packet comprising a service path identifier, service index, and service index limit, processing the trace request packet at the service node, generating a trace report packet at the service node, the trace report packet comprising service function information for the service node, and transmitting the trace report packet.

In another embodiment, an apparatus generally comprises an interface for receiving a trace request packet at a service node on a service chain, a processor for processing the trace request packet and determining whether to forward the trace request packet on the service chain or generate a trace report packet based on a comparison of a service index to a service index limit in the trace request packet, and memory for storing service function information. The trace report packet comprises the service function information. The trace request packet is forwarded on the service chain according to a service path identifier and the service index.

In yet another embodiment, an apparatus generally comprises an interface for transmitting a trace request packet and receiving a trace report packet on a service chain, a processor for generating the trace request packet and processing the trace report packet to identify a status of a service function path of the service chain, and memory for storing service function information from the trace report packet. The trace request packet comprises a service path identifier and a service index for use in routing the trace request packet on the service chain.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

A service chain is a data structure defining a set of service nodes hosting various service functions and the order in which the service functions should be applied to the data of selected traffic. Service chaining involves the interception of traffic and directing of traffic through a series of service nodes (i.e., physical or virtual devices) that each support one or more service functions. A path instantiated from ingress/classifier to egress via various service functions is known as a Service Function Path (SFP).

Network Service Header (NSH) is a dataplane header that may be added to frames/packets for use in service chains. The header contains information used for service chaining, as well as metadata added and consumed by network nodes and service elements. NSH may be used across a range of devices, both physical and virtual. In one example, NSH may be implemented as described in IETF draft "Network Service Header", P. Quinn et al., Feb. 24, 2015 (draft-quinn-sfc-nsh-07.txt).

Conventional route tracing techniques such as traceroute, do not accurately trace a route in a service path. Programs such as traceroute typically utilize Internet Protocol (IP) packets. In a first IP packet, a Time to Live (TTL) field is set to 1. Whenever an IP packet reaches a router, the TTL field is decremented by the router. When a router detects that the TTL value has reached 0, it sends an Internet Control Message Protocol (ICMP) time exceeded or timeout message back to the source node. By sequentially increasing the TTL field and monitoring the returning ICMP timeout messages, a source node can discover an IP route. Since NSH encapsulation in service chains does not use TTL, conventional traceroute cannot be used. Another issue with conventional route tracing processes is with regard to the sending of a trace report packet back to the client requesting the trace. With service function chaining, paths are unidirectional and switches may lack routing lookup capability to perform a reverse lookup.

The embodiments described herein provide liveness detection and tracing of service-hops for a service path in a service function chain. Operations and management capabilities may therefore be provided in a service function chaining environment.

Referring now to the drawings, and first to FIG. 1, a network in which embodiments described herein may be implemented is shown. The embodiments operate in the context of a data communication network including multiple network devices. For simplification, only a small number of nodes are shown. The network may include any number of network devices in communication via any number of nodes (e.g., routers, switches, controllers, gateways, access layer devices, aggregation layer devices, edge devices, core devices, or other network devices), which facilitate passage of data within the network.

The network shown in the example of FIG. 1 includes a plurality of network devices 10 (e.g., routers R1, R2, R3, R4) connected by links 14. The routers 10 may be located in one or more networks and there may be any number of network devices interposed between the nodes shown in FIG. 1. The term 'router' as used herein may refer to any network device (e.g., router, switch/router) configured to perform routing functions.

One or more of the routers 10 may communicate with a controller (not shown) (e.g., ODL (open daylight) controller, SDN (software-defined networking) controller, or other centralized server). The controller may be a physical device or a virtual element, and may be located at one network device or distributed throughout the network at different network devices in communication with one another or a central controller, for example. The controller (or another network device) may include service chaining logic that defines one or more service chains.

In the example shown in FIG. 1, a service function chain includes an ingress node (R1), service nodes (R2, R3), and egress node (R4). The service chain defines an ordered set of service functions 16 to be applied to packets (frames) selected as a result of classification. The service function path (service path) SP1 is the instantiation of the service function chain in the network. A classifier (head-end node) is located at a start of the service chain and an egress node is located at an end of the service chain. The classifier may perform classification, impose a network service header, and create a service path. In the example shown in FIG. 1 node R1 is referred to as a classifier or ingress node since it is a first node in the service chain and node R4 operates as an egress node in the service chain. It is to be understood that any of the nodes shown in FIG. 1 may operate as an ingress node/classifier or egress node in different service chains.

The service nodes R2, R3 may be used to implement one or more service function chains (service chains). In the service function chaining architecture, each of the nodes R2 and R3 may be referred to as a Service Function Forwarder (SFF) based on the function performed by the node. The SFF may forward traffic to one or more connected service functions 16 according to information carried in the SFC (Service Function Chain) encapsulation, as well as handle traffic coming back from the service function.

The service node R2, R3 may be, for example, a physical or virtual element that hosts one or more service functions 16 and has one or more network locators associated therewith for reachability and service delivery. In the example shown in FIG. 1, each service node R2, R3 hosts or supports a service function 16 (S2, S3 respectively in FIG. 1) for application to payload of traffic passing through the respective service node. The service function 16 is responsible for specific treatment of received packets and may operate at the network layer or other OSI (Open Systems Interconnection) layer. The service function 16 may be a virtual instance or embedded in a physical network element.

Examples of service nodes include firewalls, load-balancers, deep packet inspectors, or other nodes that perform one or more service functions including, for example, security, wide area network and application acceleration, server load balancing, lawful intercept, intrusion detection, Network Address Translation (NAT), Network Prefix Translation (NPT), HOST_ID injection, HTTP (Hypertext Transfer Protocol) header enrichment functions, TCP (Transmission Control Protocol) optimization, and the like. Multiple service functions 16 may be embedded in the same network element. The service function 16 may be implemented at the service node 10, as shown in FIG. 1, or performed at another node in communication with the service node.

In one embodiment, the dataplane for service chaining is defined in a Network Service Header (NSH). The NSH is a data plane header added to frames/packets and contains information needed for service chaining, as well as metadata added and consumed by network nodes (e.g., service nodes R2, R3) and service elements (e.g., service functions 16). The ingress node R1 may, for example, impose an NSH with a service function path identifier (SFP ID) and service index (SI), which will follow the service path SP1 and apply a set of services S2, S3. The service path identifier identifies the service path. The service index provides a location within the service path and is decremented by service functions (or proxy nodes) after performing services. The service nodes R2 and R3 may use the service index in the NSH to identify the service functions S2 and S3, respectively, and forward the packet for processing.

It is to be understood that the service header, service function path identifier, and service index described herein are only examples and that other types of headers or identifiers may be used without departing from the scope of the embodiments. For example, the service function path identifier may be any type of identifier used to indicate a service path for use by participating nodes for path selection. The term 'service index' as used herein may refer to any type of network locator that provides location within the service path.

In certain embodiments, one or more network devices 10 include a trace module 18 operable to generate, process, or transmit a trace request packet 15 or trace report (response) packet 17 for use in tracing paths in a service function chain. The trace report packet 17 is used to provide information about the nodes, services, and paths in a service function chain. For example, a client node may use the information provided in one or more trace report packets 17 to detect liveness of a service path and trace service-hops in the service path. In one embodiment, the packets 15, 17 comprise a network service header including the service path identifier and service index, as described below with respect to FIGS. 5 and 6.

The trace request packet 15 further includes a service index limit that is used in determining whether the node 10 should generate and transmit the trace report packet 17 or forward the trace request packet 15 on the service path. For example, if the service node 10 processes a trace request packet 15 with a service index equal to or less than the service index limit in the trace request packet, it may drop the trace request packet and generate the trace report packet 17. The service index limit is set by the node initiating the trace request and remains constant (fixed value) as the trace request packet is routed on the service path. The service node 10 may also generate a trace report packet 17 if the service index is equal to zero or the node cannot find the next service-hop, as described in detail below with respect to FIG. 4. It is to be understood that the term "service index limit" as used herein may refer to any type of index that may be inserted into the trace request packet and used to identify the service node in the service chain that should generate the trace report packet.

The ingress node R1 may generate and transmit the trace request packet 15. The trace report packet 17 may be returned to the originating node R1 or transmitted to another node, such as a central management station (not shown). As described below, the address to which the trace report packet 17 is to be sent may be identified in the trace request packet 15.

In one embodiment, the ingress node R1 transmits multiple trace request packets 15, each packet having a different service index limit, and receives multiple trace report packets 17. For example, a first trace request packet 15 may be transmitted with a service index limit configured such that the first service node (e.g., R2 in FIG. 1) will generate the trace report packet 17 with service function information for S2. A second trace request packet 15 may be transmitted with a service index limit configured such that the first service node R2 will forward the packet on the service chain to the next service node R3, which will generate the trace report packet 17. This process may continue until the last node on the service chain transmits a trace report packet 17.

In another embodiment, each service function 16 may insert service function information into the trace request packet 15 and then forward the packet on the service chain until the trace request packet reaches the last node on the service chain. The last node will then generate the trace report packet 17 comprising service information for all of the service nodes within the service path and transmit the trace report packet to the node requesting the service information.

It is to be understood that the network shown in FIG. 1 is only an example and the embodiments described herein may be implemented in networks comprising different network topologies or network devices, or using different network protocols, without departing from the scope of the embodiments. For example, the network may include any number or type of service chains, service nodes, service functions, classifiers, or controllers. The embodiments may operate, for example, over VxLAN (Virtual Extensible LAN), Transmission Control Protocol (TCP), UDP (User Datagram Protocol), Ethernet, GRE (Generic Routing Encapsulation), VxLAN GPE (VxLAN Generic Protocol Extension), or any other transport.

Figure 2:
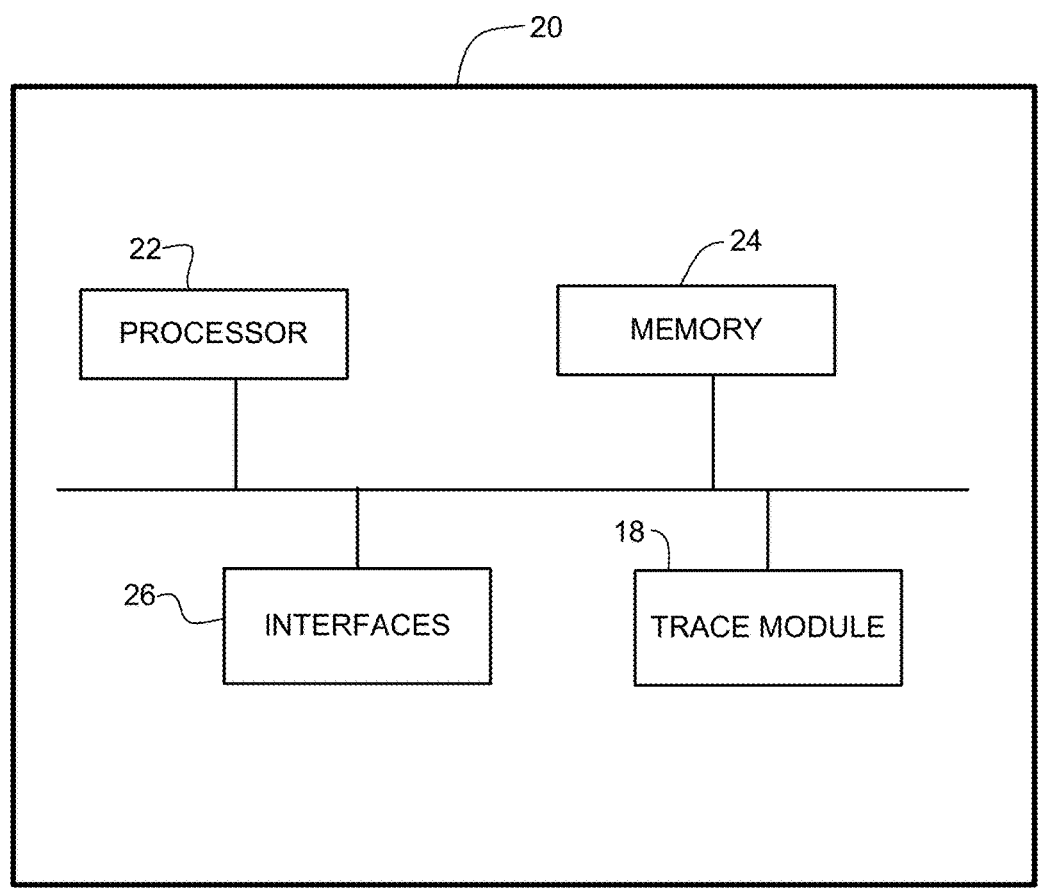
FIG. 2 depicts an example of a network device useful in implementing embodiments described herein.

FIG. 2 illustrates an example of a network device 20 (e.g., router, service node in FIG. 1) that may be used to implement the embodiments described herein. In one embodiment, the network device 20 is a programmable machine that may be implemented in hardware, software, or any combination thereof. The network device 20 includes one or more processor 22, memory 24, network interfaces 26, and trace module 18.

Memory 24 may be a volatile memory or non-volatile storage, which stores various applications, operating systems, modules, and data for execution and use by the processor 22. For example, components of trace module 18 (e.g., code, logic, software, firmware, etc.) may be stored in memory 24. Memory 24 may also store service information.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In certain embodiments, logic may be encoded in non-transitory computer-readable media.

The network interfaces 26 may comprise any number of interfaces (linecards, ports) for receiving data or transmitting data to other devices. As shown in FIG. 1, the routers 10 may comprise interfaces for transmitting trace request packets or trace report packets, or receiving trace request packets or trace report packets on a service path of the service chain. The network interface 26 may include, for example, an Ethernet interface for connection to a computer or network. The network interfaces 26 may be configured to transmit or receive data using a variety of different communication protocols. The interfaces 26 may include mechanical, electrical, and signaling circuitry for communicating data over physical links coupled to the network.

It is to be understood that the network device 20 shown in FIG. 2 and described above is only an example and that different configurations of network devices may be used. The network device 20 may further include any suitable combination of hardware, software, algorithms, processors, devices, components, or elements operable to facilitate the capabilities described herein. For example, as described above, the service node 10 may comprise components or modules operable to perform service function forwarder or service function operations.

Figure 3:
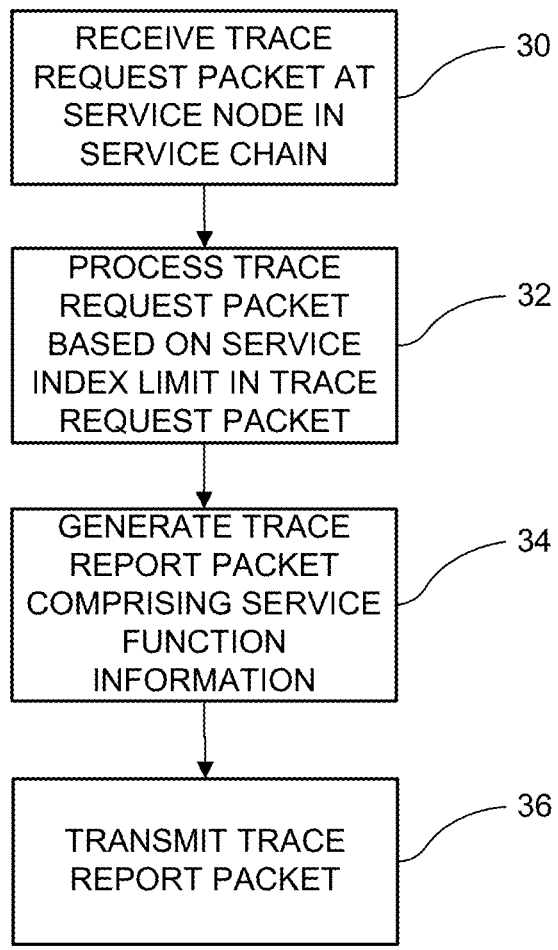
FIG. 3 is a flowchart illustrating an overview of a process for tracing paths in service function chains, in accordance with one embodiment.

FIG. 3 is a flowchart illustrating an overview of a process for tracing a route in a service function chain, in accordance with one embodiment. At step 30, a trace request packet 15 is received at a network device (e.g., service node 10 hosting service function 16 in FIG. 1). The trace request packet 15 includes a service path identifier and service index for use in routing the packet on the service chain. The service node 10 processes the trace request packet based on a service index limit in the trace request packet (step 32). In one embodiment, when the service function 16 receives the trace request packet it decrements the service index (SI) and if the service index is equal to the service index limit, the service function adds its service information (e.g., SF type, SF name) at the end of existing headers in the trace request packet. After processing by the service function 16, the service function forwarder (SFF) determines whether to forward the trace request packet on the service chain or generate a trace report packet based on a comparison of the service index to the service index limit in the trace request packet, as described further below with respect to FIG. 4.

If the service node 10 determines that a trace report packet 17 should be generated, it drops the trace request packet 15 and generates and transmits the trace report packet 17 (step 34). The trace report packet 17 includes service function information inserted by the service function 16 and may be routed, for example, based on a header in the trace request packet 15. The service node 10 preferably uses the same encapsulation as the received trace request packet 15 when building the trace report packet 17. For example, the destination IP:port may be the destination IP:port found in an OAM trace NSH header. The entire NSH trace header and report section may be copied from the received packet. The service node changes the trace message type to trace report and transmits the trace report packet 17 to the trace requesting node (e.g., client node originating trace request in service chain or management node) (step 36). Information inserted into the trace report packet 17 may include, for example, service function type, service function name, load information, or any other data about the service function, service node, or service function path.

Figure 4:
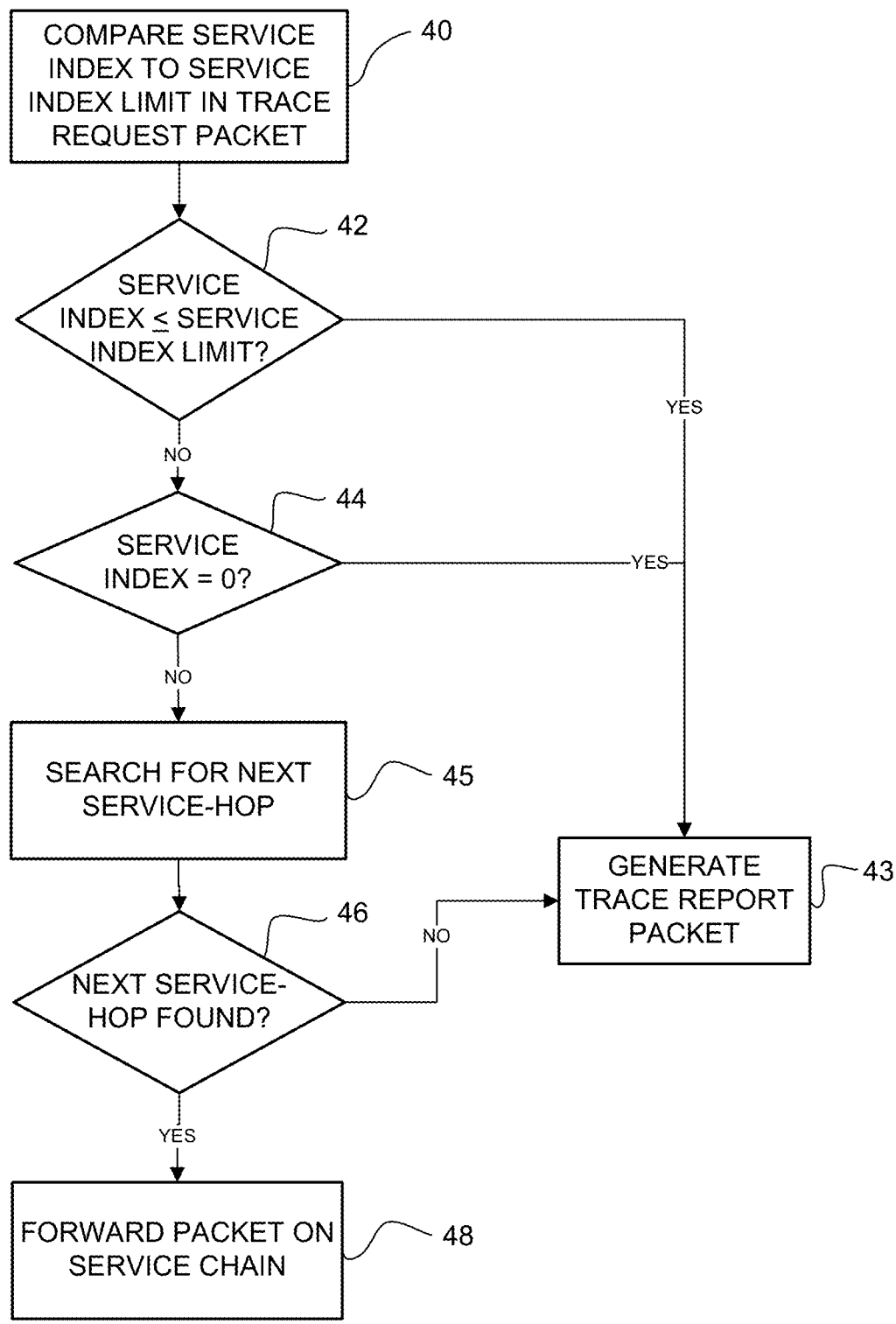
FIG. 4 is a flowchart illustrating details of the process shown in FIG. 3, in accordance with one embodiment.

FIG. 4 is a flowchart illustrating an example of a process for determining whether the trace request packet 15 received at the service node 10 should be forwarded or a trace report packet 17 generated (FIGS. 1 and 4). At step 40, the service index is compared to the service index limit in the trace request packet 15. As described above, the service index in the received packet may be decremented by the service function before comparing the service index to the service index limit. If the service index is less than or equal to the service index limit, the trace report packet 17 is generated (steps 42 and 43). As noted above, if the service index is equal to the service index limit, the service function 16 adds its service information to the trace request packet 15. This information is inserted into the trace report packet 17. If the service index is zero, a trace packet is also generated (steps 44 and 43).

If the service index is greater than the service index limit and the service index is not equal to zero, the service node 10 may search for a next service-hop to forward the trace request packet (step 45). If the service node (SFF) cannot find the next service-hop in the service chain, it may drop the trace request packet 15 and generate the trace report packet 17 even if the service index limit is different from the service index (steps 46 and 43). This ensures that the trace ends at the end of the service path regardless of whether or not the service index has reached the service index limit and allows a user to perform a trace that will traverse the entire path without having to know beforehand the number of service-hops in the path by setting service index limit to zero.

If the next service-hop is found, the packet is forwarded on the service chain according to the service path identifier and service index in the trace request packet (steps 46 and 48). The service node routes the trace request packet according to the service path identifier and service index as it would any other service chain packet. This ensures that the trace request packet 15 follows the same path as data packets on the service chain.

It is to be understood that the processes shown in FIGS. 3 and 4 and described above are only examples and steps may be removed, added, modified, reordered, or combined, without departing from the scope of the embodiments.

FIG. 5 illustrates an SFC (Service Function Chain) trace request packet format, in accordance with one embodiment. The trace packet, generally indicated at 50, includes an NSH header comprising the following fields: version; OAM (Operations, Administration, and Management) bit; length; MD (metadata) type; and next protocol. The version field is used to ensure backward compatibility. The O bit indicates that the packet is an OAM packet. The C bit is used to indicate that a critical metadata TLV is present. The other flags are reserved in this example. The length may be six for MD-Type 1, for example. The MD type indicates the format of NSH beyond the base header and the type of metadata being carried. MD-Type=0x1 indicates that the format of the header includes fixed length context headers. The next field indicates the protocol type of the packet. In one example, version=1, OAM bit=1, length=6, MD-Type=1, and the next protocol is OAM protocol.

The OAM trace portion of the packet includes a trace message type, SIL (Service Index Limit), and Destination Port field, as shown in FIG. 5. The trace message type is 1 for a trace request packet and 2 for a trace report packet. The SIL is at least one less than the starting service index. The trace packet stops when the service index reaches the SIL. The SIL is determined at the time the packet is first sent by the client (node initiating the trace), therefore it does not need to be decremented during data path processing. The destination port is the port that the trace report is sent. The destination IP is the IP address that the trace report is sent.

In one embodiment, the NSH trace packet uses fixed size 128-bit IP address fields for both IPv6 and IPv4 addresses. When the address field holds an IPv6 address, the fixed size 128-bit IP address field holds the IPv6 address stored as is. When the address field holds an IPv4 address, an IPv4 mapped IPv6 address may be used (::ffff:0:0/96) (e.g., IETF RFC 4291, "IP Version 6 Addressing Architecture", R. Hinden et al., February 2006). This has the first 80 bits set to zero and the next 16 bits set to one, while its last 32 bits are filled with the IPv4 address. When checking for an IPv4 mapped IPv6 address, all of the first 96 bits are checked for the pattern. The all-zeros IPv6 address is expressed by filling the fixed-size 128-bit IP address field with zeros (::). The all-zeros IPv4 address is expressed by 80 bits of zeros, 16 bits of ones, and 32 bits of zeros (::ffff:0:0). It is to be understood that the above mapping is one example for normalizing the IPv4 address into an IPv6 address space and that other methods to achieve this mapping may be used without departing from the scope of the embodiments.

In one embodiment, the client (e.g., node initiating trace request packet) may insert the source IP:port in the NSH header. For example if the client is behind NAT it can acquire a stable external IP:port and put those in the NSH header. This allows for NAT traversal so that an NSH trace may function behind NAT.

FIG. 6 illustrates an SFC trace report packet format, in accordance with one embodiment. The trace report packet, generally indicated at 60, carries the identification of the service function that last processed the packet (SF Type and SF Name fields). In all other aspects, the trace report packet may have the same format as the trace request packet 50 shown in FIG. 5 and described above.

In one example, the SF type length is expressed in 4-byte words. For example, the SF type may be a string representing the SF type padded to a 4-byte boundary and encoded with UTF-8 (Universal Character Set Transformation Format-8-bit). The SF name length may also be expressed in 4-byte words. The SF name may be, for example, a string representing the service function padded to a 4-byte boundary and encoded with UTF-8. IETF Internet Draft "Yang Data Model for Service Function Chaining" (draft-penno-sfc-yang-13), R. Penno et al., Mar. 2, 2015, provides examples of SF types and SF names.

It is to be understood that the packet formats shown in FIGS. 5 and 6 and described above are only examples and that different headers, formats, fields, flags, or entries, may be used without departing from the scope of the embodiments. For example, the OAM flag is only an example, and other types of flags or fields or placement of flags may be used, without departing from the scope of the embodiments.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
receiving a trace request packet at a service node in a service chain, the trace request packet comprising a service path identifier, a service index, and a service index limit that remains constant for use in identifying at least one service node in the service chain to generate a trace report packet, the service index providing a location within the service path;
processing the trace request packet at the service node;
generating the trace report packet at the service node, the trace report packet comprising service function information of a plurality of service functions in the service chain; and
transmitting the trace report packet;
wherein each of a plurality of service nodes in the service chain inserts its service function information into the trace request packet.

2. The method of claim 1 wherein the service index is decremented at a respective service function and the service index limit remains the same.

3. The method of claim 1 wherein the service index limit is set by a node originating the trace request packet for use in identifying the service node generating the trace report packet.

4. The method of claim 1 wherein processing comprises comparing the service index to the service index limit.

5. The method of claim 4 wherein the service index is less than or equal to the service index limit.

6. The method of claim 4 wherein processing the trace request packet further comprises decrementing the service index at a respective service function before comparing the service index to the service index limit.

7. The method of claim 1 wherein the service index is equal to zero.

8. The method of claim 1 wherein transmitting the trace report packet comprises routing the trace report packet to a destination address indicated in the trace request packet.

9. The method of claim 1 further comprising searching for a next service-hop and failing to find the next service-hop.

10. The method of claim 1 further comprising receiving another trace request packet and forwarding the trace request packet on the service chain according to the service path identifier and the service index.

11. The method of claim 1 wherein processing the trace request packet comprises determining that the service index is equal to the service index limit and inserting the service function information into the trace request packet at a respective service function.

12. The method of claim 1 wherein the trace request packet comprises an operations, administration, and management packet.

13. The method of claim 1 wherein the trace request packet comprises a network service header.

14. An apparatus comprising:
an interface for receiving a trace request packet at a service node on a service chain, the trace request packet comprising a service index limit that remains constant for use in identifying at least one service node in the service chain to generate a trace report packet;
a processor for processing the trace request packet and determining whether to forward the trace request packet on the service chain or to generate the trace report packet based on a comparison of a service index to the service index limit in the trace request packet; and
memory for storing service function information;
wherein the trace report packet comprises the service function information of a plurality of service functions in the service chain, and the trace request packet is forwarded on the service chain according to a service path identifier and the service index.

15. The apparatus of claim 14 wherein processing the trace request packet comprises decrementing the service index in the trace request packet before comparing it to the service index limit.

16. The apparatus of claim 14 wherein processing the trace request packet comprises determining that the service index is equal to the service index limit and inserting the service function information into the trace request packet at a respective service function.

17. The apparatus of claim 14 wherein determining whether to forward the trace request packet or to generate the trace report packet comprises determining that the service index is less than or equal to the service index limit and generating the trace report packet.

18. An apparatus comprising:
an interface for transmitting a trace request packet and receiving a trace report packet on a service chain;
a processor for generating the trace request packet and processing the trace report packet to identify a status of a service function path of the service chain; and
memory for storing service function information from the trace report packet;
wherein the trace request packet comprises a service path identifier, a service index for use in routing the trace request packet on the service chain, and a fixed service index limit that remains constant for use in identifying a service node in the service chain to generate the trace report packet, the service index providing a location within the service path; and
wherein the trace report packet comprises the service function information of a plurality of service functions in the service function chain.

19. The apparatus of claim 18 wherein the trace request packet comprises a source IP (Internet Protocol) port and address identifying a location to transmit the trace report packet.

* * * * *